(12) United States Patent
Pattan (10) Patent No.: US 9,781,388 B2
(45) Date of Patent: Oct. 3, 2017

(54) METHOD AND SYSTEM FOR ENHANCING USER EXPERIENCE DURING AN ONGOING CONTENT VIEWING ACTIVITY

(71) Applicant: Samsung Electronics Co., Ltd., Gyeonggi-do (KR)

(72) Inventor: Basavaraj Jayawant Pattan, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 199 days.

(21) Appl. No.: 14/404,149

(22) PCT Filed: May 28, 2013

(86) PCT No.: PCT/KR2013/004660
§ 371 (c)(1),
(2) Date: Nov. 26, 2014

(87) PCT Pub. No.: WO2013/180437
PCT Pub. Date: Dec. 5, 2013

(65) Prior Publication Data
US 2015/0139609 A1    May 21, 2015

(30) Foreign Application Priority Data

May 28, 2012    (IN) .......................... 2107/CHE/2012

(51) Int. Cl.
*H04N 9/80* (2006.01)
*H04N 7/15* (2006.01)
(Continued)

(52) U.S. Cl.
CPC ....... *H04N 7/155* (2013.01); *G06F 17/30038* (2013.01); *G11B 27/10* (2013.01)

(58) Field of Classification Search
CPC ......... G06F 17/30038; G06F 17/30884; G06F 17/241; G06F 17/30855; G11B 27/10; H04N 7/155
(Continued)

(56) References Cited

U.S. PATENT DOCUMENTS 8,131,647 B2 * 3/2012 Siegel ............... G06F 17/30038
705/57
8,209,397 B2 * 6/2012 Ahn .................. G06F 17/30884
709/217
(Continued)

FOREIGN PATENT DOCUMENTS

| EP | 1274022 A2 | * | 1/2003 |
| GB | 2403304 A | * | 12/2004 |
| JP | 2002245034 | * | 8/2002 |

OTHER PUBLICATIONS

European Search Report dated Jan. 25, 2016 issued in counterpart application No. 13797120.6.-1507, 7 pages.
(Continued)

*Primary Examiner* — David Harvey
(74) *Attorney, Agent, or Firm* — The Farrell Law Firm, P.C.

(57) ABSTRACT

A method and system for providing immersive user experience in a social experience (SE) environment by allowing users to create content Bookmarks. The SE environment amalgamates content received from various sources available in the network. The method streams the amalgamated content to the users through an SE server. The SE server provides enhanced experience service to the users by allowing the users to store, retrieve, and share the created Bookmarks with other users.

12 Claims, 5 Drawing Sheets

(51) Int. Cl.
*G11B 27/10* (2006.01)
*G06F 17/30* (2006.01)

(58) Field of Classification Search
USPC .......................................................... 386/241
See application file for complete search history.

(56) References Cited

U.S. PATENT DOCUMENTS

| | | | | |
|---|---|---|---|---|
| 8,327,260 | B2* | 12/2012 | Bays | G06F 17/241 |
| | | | | 707/707 |
| 8,762,853 | B2* | 6/2014 | Spielberg | G06F 3/165 |
| | | | | 715/228 |
| 9,319,732 | B2* | 4/2016 | Lee | H04N 21/4126 |
| 9,319,744 | B2* | 4/2016 | Sugimoto | H04N 21/47217 |
| 2002/0016786 | A1* | 2/2002 | Pitkow | G06F 17/30884 |
| 2002/0059342 | A1* | 5/2002 | Gupta | G06F 17/241 |
| | | | | 715/233 |
| 2002/0069218 | A1* | 6/2002 | Sull | G06F 17/30796 |
| | | | | 715/202 |
| 2004/0021685 | A1* | 2/2004 | Denoue | G06F 17/30017 |
| | | | | 715/721 |
| 2004/0240562 | A1* | 12/2004 | Bargeron | H04N 7/165 |
| | | | | 375/240.29 |
| 2005/0198202 | A1* | 9/2005 | Yamamoto | G06F 17/2247 |
| | | | | 709/218 |
| 2005/0216526 | A1* | 9/2005 | Kumagai | G06F 17/30884 |
| 2005/0223315 | A1* | 10/2005 | Shimizu | G06F 17/241 |
| | | | | 715/230 |
| 2005/0268220 | A1* | 12/2005 | Tanaka | G06F 17/241 |
| | | | | 715/232 |
| 2006/0259957 | A1* | 11/2006 | Tam | G06F 21/10 |
| | | | | 726/3 |
| 2007/0244903 | A1* | 10/2007 | Ratliff | G06F 17/30038 |
| 2008/0046925 | A1* | 2/2008 | Lee | G06F 17/30817 |
| | | | | 725/37 |
| 2008/0098294 | A1* | 4/2008 | Le | G06F 17/241 |
| | | | | 715/230 |
| 2008/0154908 | A1* | 6/2008 | Datar | G06F 17/30817 |
| 2008/0282198 | A1* | 11/2008 | Brooks | G06Q 10/10 |
| | | | | 715/854 |
| 2009/0087160 | A1* | 4/2009 | Lui | G06F 17/241 |
| | | | | 386/282 |
| 2009/0154893 | A1* | 6/2009 | Vasudevan | H04N 5/765 |
| | | | | 386/207 |
| 2009/0187825 | A1* | 7/2009 | Sandquist | G06F 17/241 |
| | | | | 715/719 |
| 2009/0210779 | A1* | 8/2009 | Badoiu | G06F 17/3082 |
| | | | | 715/230 |
| 2009/0288120 | A1 | 11/2009 | Vasudevan et al. | |
| 2009/0319885 | A1* | 12/2009 | Amento | G06Q 10/10 |
| | | | | 715/230 |
| 2010/0082681 | A1* | 4/2010 | Adimatyam | G11B 27/32 |
| | | | | 707/784 |
| 2010/0115596 | A1* | 5/2010 | Horozov | G06F 21/10 |
| | | | | 726/7 |
| 2010/0153364 | A1 | 6/2010 | Kirby | |
| 2010/0241691 | A1* | 9/2010 | Savitzky | G06F 15/16 |
| | | | | 709/203 |
| 2010/0313113 | A1* | 12/2010 | Chen | G06F 17/30241 |
| | | | | 715/230 |
| 2011/0066743 | A1 | 3/2011 | Hurley et al. | |
| 2011/0126105 | A1* | 5/2011 | Isozu | G06F 17/3082 |
| | | | | 715/720 |
| 2011/0173524 | A1* | 7/2011 | Chan | G06F 17/30041 |
| | | | | 715/206 |
| 2011/0219386 | A1* | 9/2011 | Hwang | G06F 17/30852 |
| | | | | 719/328 |
| 2011/0246471 | A1* | 10/2011 | Rakib | G11B 27/28 |
| | | | | 707/741 |
| 2011/0283175 | A1* | 11/2011 | Pettit | G06F 17/30884 |
| | | | | 715/208 |
| 2011/0320430 | A1* | 12/2011 | Coupe | G06F 17/30884 |
| | | | | 707/711 |
| 2012/0030554 | A1* | 2/2012 | Toya | H04N 7/17318 |
| | | | | 715/206 |
| 2012/0089911 | A1* | 4/2012 | Hosking | G06F 17/30743 |
| | | | | 715/716 |
| 2012/0110425 | A1 | 5/2012 | Kim | |
| 2012/0131430 | A1* | 5/2012 | Chen | G06F 17/241 |
| | | | | 715/206 |
| 2012/0209841 | A1* | 8/2012 | Saretto | G06F 17/218 |
| | | | | 707/736 |
| 2013/0230248 | A1* | 9/2013 | Alexander | G06F 17/30884 |
| | | | | 382/182 |
| 2013/0282877 | A1* | 10/2013 | Keum | H04L 65/601 |
| | | | | 709/219 |
| 2014/0089775 | A1* | 3/2014 | Worsley | G06F 17/30575 |
| | | | | 715/230 |
| 2014/0201126 | A1* | 7/2014 | Zadeh | G06K 9/627 |
| | | | | 706/52 |
| 2014/0237347 | A1* | 8/2014 | Jeyachandran | G06F 17/241 |
| | | | | 715/234 |

OTHER PUBLICATIONS

PCT/ISA/237 Written Opinion issued on PCT/KR2013/004660 (pp. 6).
PCT/ISA/210 Search Report issued on PCT/KR2013/004660 (pp. 3).
Kanawati, Rushed et al., A Multi-agent System for Collaborative Bookmarking, in the Proc. of the first Int. joint Conf. On AAMS, 2002, ISBN: 1-58113-480-0, pp. 84-97.

* cited by examiner

METHOD AND SYSTEM FOR ENHANCING USER EXPERIENCE DURING AN ONGOING CONTENT VIEWING ACTIVITY

PRIORITY

This application is a National Phase Entry of PCT International Application No. PCT/KR2013/004660, which was filed on May 28, 2013, and claims a priority to Indian Patent Application No. 2107/CHE/2012, which was filed on May 28, 2012, the contents of each of which are incorporated herein by reference.

TECHNICAL FIELD

The present invention relates to providing a social experience in content viewing and more particularly to enhancing content viewing by adopting new social experience services supported during an ongoing content viewing activity.

BACKGROUND ART

Traditionally, users attend social networking events such as classroom sessions, training sessions, entertainment events or the like by being physically present in the venue or by using an audio/video system supported in a social experience (SE) environment.

The current SE environment imposes a limitation on the immersive experience of the users while attending networking events. The lack of immersive experience in the SE environment is mainly attributed to the lack of physical proximity of users during an ongoing content viewing activity.

DISCLOSURE OF INVENTION

Technical Problem

Currently, the SE environment supports content streaming on independent communication channels that results in an additional cost to actively connect the users. Also, it imposes a challenge to engage users in concurrent events in such an environment.

Due to abovementioned reasons, existing methods do not provide enhanced social experience during an ongoing content viewing activity.

Solution to Problem

The principal object of the embodiments herein is to provide a method and system that enables Social Experience (SE) environment users to Bookmark the content during an ongoing content viewing activity.

Another object of the invention is to provide a method to enable the SE environment users to make annotations along with the requested Bookmark.

Another object of the invention is to provide a method to enable the SE environment users to retrieve and share list of Bookmarks created by the users.

Another object of the invention is to provide a method to analyze the requested Bookmark with the existing Bookmark for triggering notifications.

Another object of the invention is to provide a method to view the content associated with the Bookmark.

Accordingly the invention provides a method for creating a Bookmark during an ongoing content viewing activity, wherein the method comprises receiving at least one request to create the Bookmark from at least one user during the ongoing content viewing activity. At least one request comprises at least one parameter and at least one information. Further the method comprises determining whether the at least one user is authorized to create the Bookmark. The method further comprises creating the Bookmark for the at least one request sent from the at least one user. The method comprises sending the created Bookmark with Bookmark identity and the at least one information to the at least one user.

Accordingly the invention provides a system for creating a Bookmark during an ongoing content viewing activity, wherein the system comprises a server, at least one content provider, wherein the system is configured to receive at least one request to create the Bookmark by the server from at least one user in the ongoing content viewing activity, wherein the at least one request comprises at least one parameter and at least one information. Further the system is configured to determining whether the at least one user is authorized to create the Bookmark. The system is further configured to create the Bookmark by the server for the at least one request sent from the at least one user. The system is configured to send the created Bookmark with Bookmark identity and the at least one information to the at least one user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to create a Bookmark during an ongoing content viewing activity in a Social Experience (SE) environment. The method allows a user to store, retrieve and share the created Bookmarks by the user with a plurality of other users. Additionally, the method allows users to access related stored Bookmarks.

The method provides a SE server to retrieve the request from the users to create Bookmarks and retrieve created Bookmarks.

In an embodiment, the ongoing content viewing activity (wherein the terms "ongoing content viewing activity" and "event" have been used interchangeably herein) can be an amalgamation of various data streams which are received as main content and/or data streams which are received from a remote SE client (s) and/or associated contents that can be a video, an audio, an animation, a stored content, a picture, chatting session, conference session or the like. The event can be viewed on at least one of the SE client.

In an embodiment, the SE client used in the SE environment can be a smart phone, a tablet, a laptop, a Personal Digital Assistant (PDA), or any device capable of communicating with other devices.

Referring now to the drawings, and more particularly to FIGS. 1 through 6, where similar reference characters denote corresponding features consistently throughout the figures, there are shown preferred embodiments.

Figure 1:
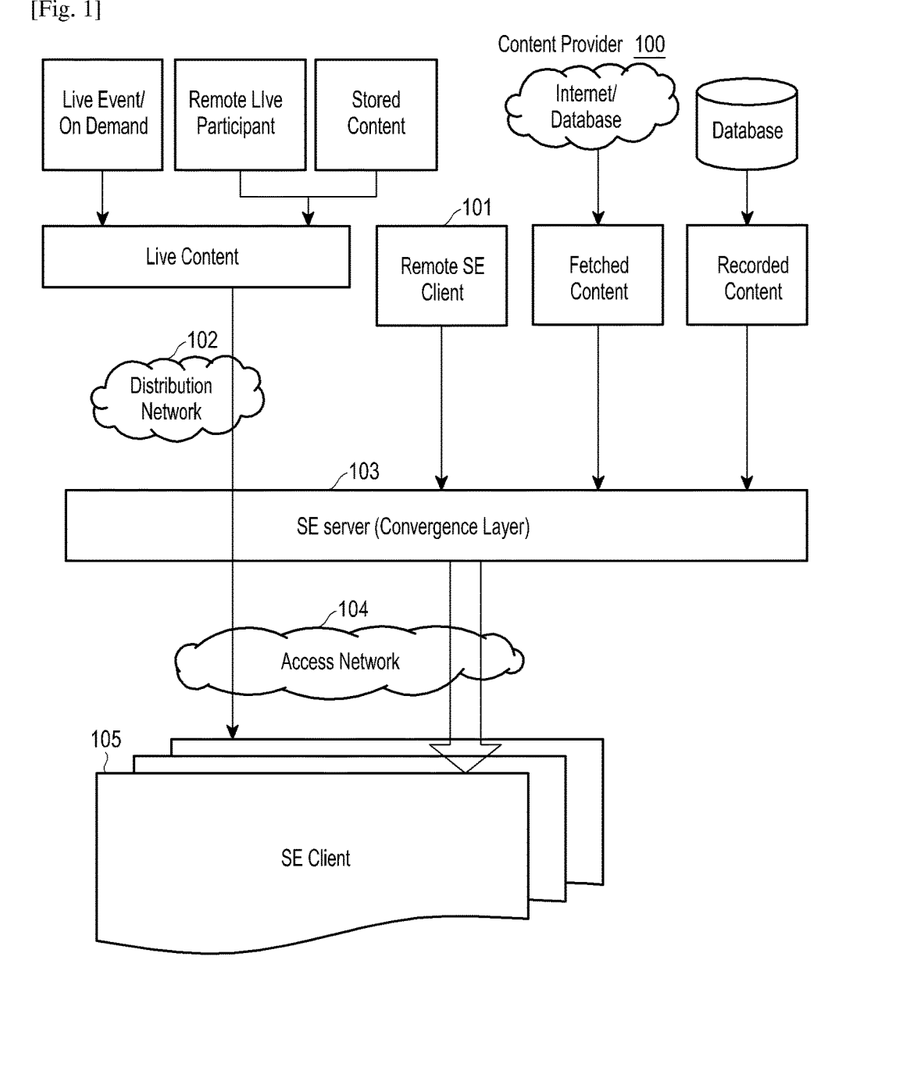
FIG. 1 is a system overview illustrating an immersive social experience (SE) environment, according to embodiments as disclosed herein.

FIG. 1 is a system overview illustrating an immersive social experience (SE) environment, according to embodiments as disclosed herein. As depicted in FIG. 1, the SE environment comprises of an SE content provider 100, a remote SE client 101, a distribution network 102, an SE server 103 (known as the convergence layer), an access network 104 and one or more SE clients 105.

In an embodiment, the SE server 103 in the SE environment converges the content received from at least one of the content providers in the distribution network 102 along with zero or more content received from the remote SE client 101 and/or associated contents, and streams the converged content to the SE clients 105.

In an embodiment, the SE content provider 100 includes but is not limited to an internet, a live event, a stored content, a recorded content, and a database. The SE content provider 100 streams content to the SE client in a distribution network 102 through the SE server 103. The SE server 103 streams the content to the SE client(s) 105 through an access network 104.

In an embodiment, the distribution network 102 includes but is not limited to satellite, cable, terrestrial and IP broadcast.

In an embodiment, the access network 104 includes but is not limited to an Ethernet, a Wireless Local Area Network (LAN), an Asymmetric digital subscriber line (ADSL), a cable modem, and a Wireless Local Area Network (WLAN).

In an example, when a movie is streamed from one of the SE content provider 100 and an ongoing chatting session is streamed from another source, the SE client (s) 105 receives the event through the SE server 103 during an ongoing content viewing activity.

Figure 2:
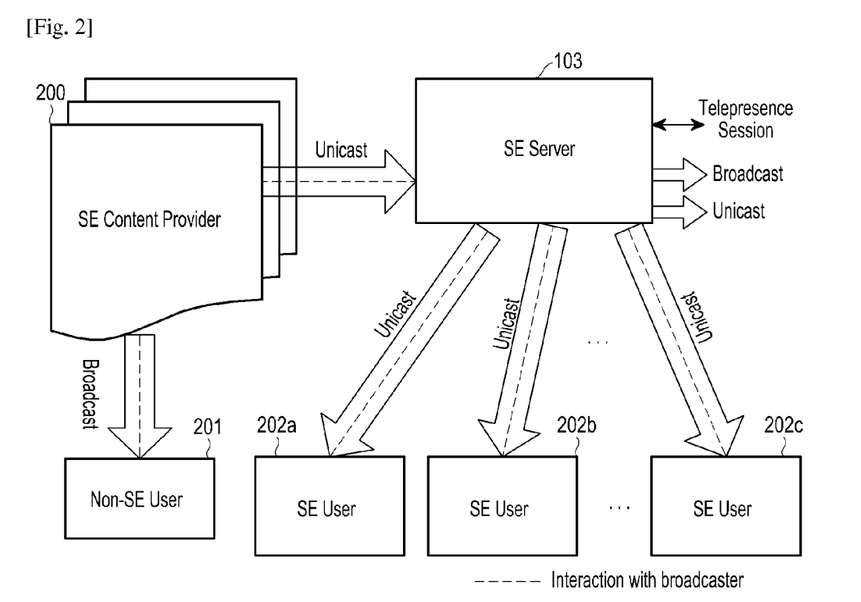
FIG. 2 illustrates the deployment of SE environment, according to embodiments as disclosed herein.

FIG. 2 illustrates the deployment of SE environment, according to embodiments as disclosed herein. As depicted in the FIG. 2, the SE content provider 200 broadcasts the event to the Non-SE user 201 in the SE environment without providing an immersive experience. Alternatively, the SE content provider 100 unicasts the event through the SE server 103. The SE server 103 provides the immersive experience for the SE users 202a, 202b, and 202c by supporting a method to create the Bookmark during the ongoing content viewing activity. In addition, the method allows the SE users 202a, 202b, and 202c to share the created Bookmarks among other SE users.

In an embodiment, the SE server 103 supports a Telepresence session, a Broadcast and a Unicast mode of communication sessions with the SE clients 202a, 202b and 202c.

In an embodiment, a Telepresence session provides a social experience of being fully present at a live real-world location remote from one's own physical location. For example, a user in the Telepresence session behaves and receives stimuli as though the user is part of a meeting even if the user is at the remote site. This experience results in enabling the user to participate in an interactive manner in group activities that brings benefit to a wide range of users.

Figure 3:
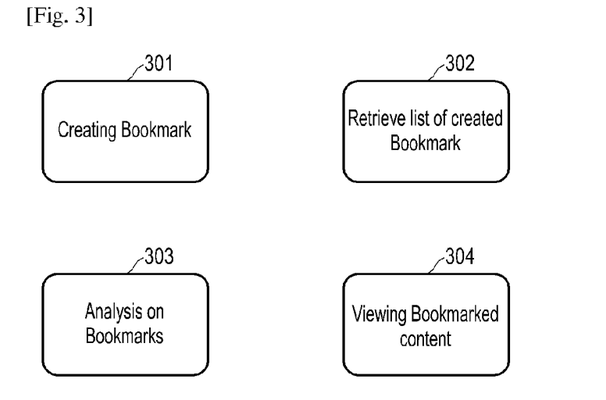
FIG. 3 illustrates the block diagram showing independent actions related to the Bookmark content from the user s perspective, according to embodiments as disclosed herein.

FIG. 3 illustrates the block diagram showing independent actions related to the Bookmark content from the user s perspective, according to embodiments as disclosed herein. Initially, the user sends the request to the SE server 103 to create (301) the Bookmark.

In an embodiment, the user wishes to retrieve (302) the list of own or other SE users created Bookmarks to the SE server 103.

In an embodiment, the SE server 103 analyses (303) the requested Bookmark with the existing Bookmarks for triggering notifications.

In an embodiment, the user views (304) the content associated with the Bookmark.

In an embodiment, the above mentioned actions 301, 302, 303 and 304 can be triggered independently by the user and the server.

Figure 4:
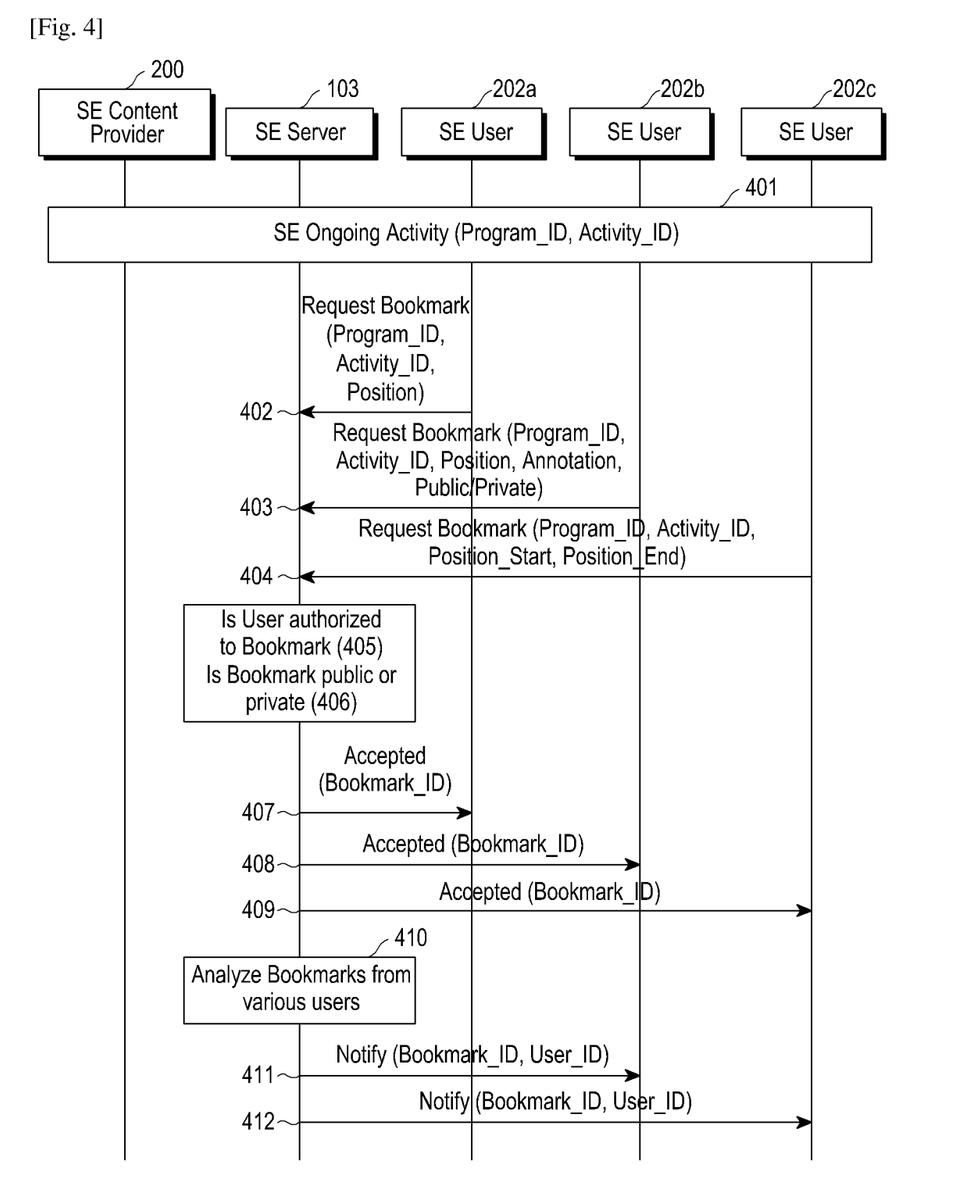
FIG. 4 illustrates a sequence diagram explaining the process of requesting Bookmarks from a plurality of users in the SE environment, according to embodiments as disclosed herein.

FIG. 4 illustrates a sequence diagram explaining the process of requesting Bookmarks from a plurality of users in the SE environment, according to embodiments as disclosed herein. FIG. 4 depicts the SE content provider 200 that streams the events to the SE clients 202a, 202b, and 202c through the SE server 103.

Initially, the SE content provider 200 establishes an ongoing content viewing activity (401) with the SE clients 202a, 202b, and 202c through the SE server 103. The SE server 103 generates an Activity_ID and a Program_ID for the ongoing content viewing activity. The generated IDs are shared with the SE clients 202a, 202b, and 202c for example by including both Activity_ID and Program_ID in a SIP INVITE sent towards SE clients.

In an embodiment, the Program_ID uniquely identifies the main content and Activity_ID uniquely identifies the associated content with the main content. During the ongoing content viewing activity, the SE client 202a sends a request to the SE server 103 to create (402) the Bookmark along with one or more parameters and one or more information.

In an embodiment, parameters can be a position to create the Bookmark in the content, and criteria specified by the SE user in the content. In an embodiment, the criteria can be a pre-configured setting, or a dynamic request for creating the Bookmark. (For example: Bookmark automatically at all positions where the character (Alice) appears in the content or at the list of songs in the content).

In an embodiment, the information can be keywords, annotations or the like.

In an embodiment, the SE client sends the request along with privacy level for the Bookmark to be created. For example, the privacy level includes but is not limited to a private Bookmark, a public Bookmark.

Further, the SE client 202*b* requests the SE server 103 to create (403) the Bookmark at a specified position in the ongoing content viewing activity along with the request to mark the annotation and to specify the Bookmark as a public Bookmark or as a private Bookmark. The public Bookmark can be accessed by any remote SE client and the private Bookmark can be accessed only by the authorized SE clients.

Further, the SE client 202*c* requests the SE server 103 to create (404) the Bookmark within the specified position on the content. The Bookmarking location can be identified with the values specified in the Position_Start and the Position_End of the content by the SE client 202*c*.

Further the SE server 103 determines (405) whether the requested SE clients 202*a*, 202*b* and 202*c* are authorized to create the Bookmark. Also, the SE server 103 determines (406) whether the information holds any privacy level request such as public Bookmark or private Bookmark.

After the SE server 103 determines that the SE clients 202*a*, 202*b* and 202*c* are authorized to create the Bookmark, then the SE server 103 creates the Bookmark for each of the SE client request. The SE clients 202*a*, 202*b*, and 202*c* receive (407), (408), (409) Bookmark_IDs (Bookmark identity) and the information from the SE server 103 respectively.

The Bookmark_ID uniquely identifies the content Bookmark that is created for a specific SE client request.

The SE server analyzes (410) whether the requested Bookmark matches with the existing Bookmarks based on the parameter and the information sent in the request by the SE client. If the SE server 103 finds that the requested Bookmark matches with the existing Bookmark for the ongoing content viewing activity, then the SE server 103 notifies (411), (412) the requested SE clients 202*b*, 202*c* with the Bookmark by sharing the Bookmark_ID and the user_ID appropriately.

The user_ID uniquely identifies the SE client who created the Bookmark for the ongoing content viewing activity.

Figure 5:
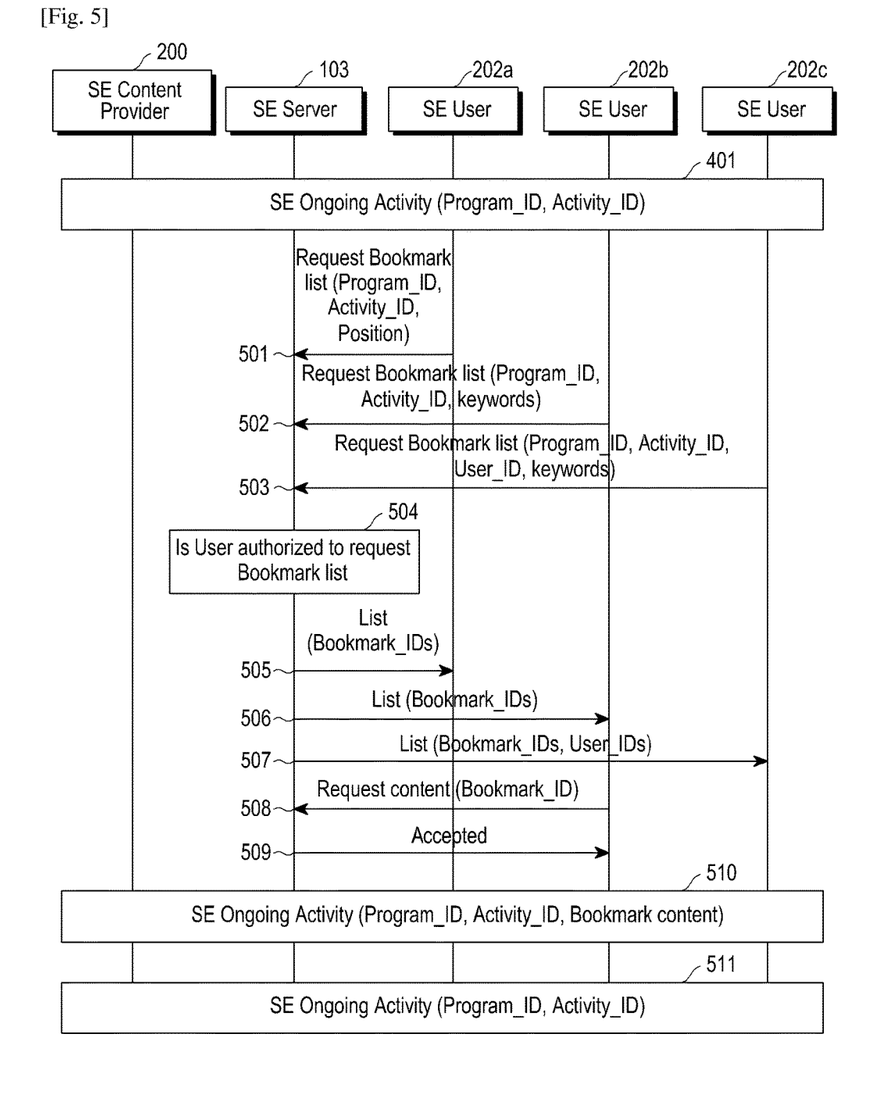
FIG. 5 illustrates the sequence diagram explaining the process of retrieving list of created Bookmarks and associated content in the SE environment, according to embodiments as disclosed herein.

FIG. 5 illustrates the sequence diagram explaining the process of retrieving list of created Bookmarks and associated content in the SE environment, according to embodiments as disclosed herein.

As depicted in FIG. 5, initially the SE content provider 200 establishes an ongoing content viewing activity (401) with the SE clients 202*a*, 202*b*, and 202*c* through the SE server 103. The SE server 103 generates the Activity_ID and the Program_ID for the ongoing content viewing activity. The generated IDs are shared with the SE clients 202*a*, 202*b*, and 202*c*.

During the ongoing content viewing activity, the SE client 202*a* sends a request with the parameters or the information to the SE server 103 to share (501) the list of Bookmark_IDs of the created Bookmark.

Further, the SE client 202*b* sends the request to the SE server 103 to share (502) the list of Bookmark_IDs with the information such as keywords.

Further, the SE client 202*c* sends the request to the SE server 103 to share (503) the list of Bookmark_IDs with information such as keywords or annotations.

Further, the SE server 103 determines (504) whether the requested SE users are authorized to retrieve the created Bookmarks. If the SE clients 202*a*, 202*b*, and 202*c* are authorized to view the list of requested Bookmarks, then the SE server 103 sends (505) (506) and (507) the list of associated Bookmarks to the requested SE clients 202*a*, 202*b*, and 202*c* respectively.

In an embodiment, parameters or information sent in the request by the SE client is matched with the parameter or information of the created Bookmarks stored in the SE server 103.

The authorized SE client 202*b* then sends (508) a request to the SE server 103 for viewing the content of the Bookmark_ID. Further the SE server 103 accepts (509) the request. Further the SE server 103 shares (510) the ongoing activity associated with the Bookmark_ID to the SE clients 202*a*, 202*b* and 202*c*. After sharing the content with the SE client 202*a*, 202*b* and 202*c*, the SE server 103 initiates (511) an ongoing content viewing activity along with a unique Program_ID and a unique Activity_ID.

Figure 6:
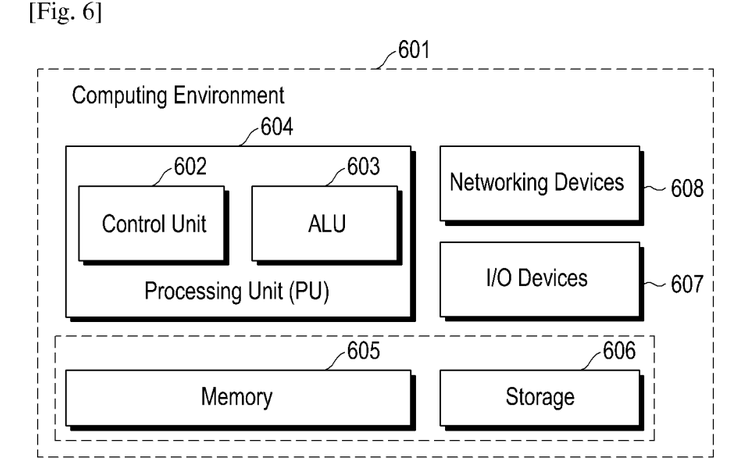
FIG. 6 illustrates a computing environment implementing the method to enhance user experience in the SE environment, according to embodiments as disclosed herein.

FIG. 6 illustrates a computing environment implementing the method to enhance user experience in the SE environment, according to embodiments as disclosed herein. As depicted the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple CPUs of different kinds, special media and other accelerators. The processing unit 604 is responsible for processing the instructions of the algorithm. Further, the plurality of processing units 604 may be located on a single chip or over multiple chips.

The algorithm comprising of instructions and codes required for the implementation are stored in either the memory unit 605 or the storage 606 or both. At the time of execution, the instructions may be fetched from the corresponding memory 605 and/or storage 606, and executed by the processing unit 604.

In case of any hardware implementations various networking devices 608 or external I/O devices 607 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2, 4, 5 and 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for creating a bookmark by a server, the method comprising:
   receiving, by the server, a first request to create a first bookmark from a first device while first content is provided to the first device, the first request including information related to the first content;
   creating the first bookmark based on the first request and transmitting information about the first bookmark to the first device, the information about the first bookmark including identity information of the first bookmark;
   receiving a second request to create a second bookmark from a second device while second content is provided to the second device, the second request including information related to the second content;
   determining whether the second bookmark matches the first bookmark; and
   transmitting the identity information of the first bookmark and identity information of the first device to the second device, based on the determining of whether the second bookmark matches the first bookmark.

2. The method of claim 1, wherein the information related to the first content further includes at least one of identity information of the first content, position information to create the first bookmark in the first content, and criteria information specified by the first device in the first content.

3. The method of claim 1, wherein the information related to the first content further includes at least one of a keyword and an annotation related to the first content.

4. The method of claim 1, wherein the information related to the first content further includes privacy level information about the first bookmark, and
   wherein the privacy level information includes at least one of private information indicating that the first bookmark is allowed access by the first device, and public information indicating that the first bookmark is allowed access by all devices including the first device and the second device.

5. The method of claim 1, wherein determining whether the second bookmark matches the first bookmark comprises comparing the information related to the first content in the first request to the information related to the second content received from the second device in the second request.

6. The method of claim 1, further comprising:
   receiving, from a third device, a third request to retrieve the first bookmark; and
   transmitting the information about the first bookmark to the third device, based on the third request,
   wherein the third device receives the first content based on the first bookmark.

7. A server for creating a bookmark, the server comprising:
   a transceiver configured to receive, from a first device, a first request to create a first bookmark while first content is provided to the first device, the first request including information related to the first content, and to receive, from a second device, a second request to create a second bookmark while second content is provided to the second device, the second request including information related to the second content; and
   a processor configured to:
      create the first bookmark based on the first request and control the transceiver to transmit information about the first bookmark to the first device, the information about the first bookmark including identity information of the first bookmark,
      determine whether the second bookmark matches the first bookmark, and
      control the transceiver to transmit the identity information of the first bookmark and identity information of the first device to the second device, based on the determining of whether the second bookmark matches the first bookmark.

8. The server of claim 7, wherein the information related to the first content further includes at least one of identity information of the first content, position to create the first bookmark in the first content, and criteria information specified by the first device in the first content.

9. The server of claim 7, wherein the information related to the first content further includes at least one of a keyword and an annotation related to the first content.

10. The server of claim 7, wherein the information related to the first content further includes privacy level information about the first bookmark, and
    wherein the privacy level information includes at least one of private information indicating that the first bookmark is allowed access by the first device, and public information indicating that the first bookmark is allowed access by all devices including the first device and the second device.

11. The server of claim 7, wherein the processor is further configured to determine whether the second bookmark matches the first bookmark by comparing the information related to the first content in the first request to the information related to the second content in the second request.

12. The server of claim 7, wherein the processor is further configured to:
    receive, from a third device, a third request to retrieve the first bookmark; and
    control the transceiver to transmit the information about the first bookmark to the third device, based on the third request,
    wherein the third device receives the first content based on the first bookmark.

* * * * *